May 16, 1950 — A. Y. DODGE — 2,508,105
BRAKE
Filed Jan. 18, 1947 — 4 Sheets-Sheet 1

Inventor:
Adiel Y. Dodge,
By Dawson, Booth my Spangenberg,
Attorneys.

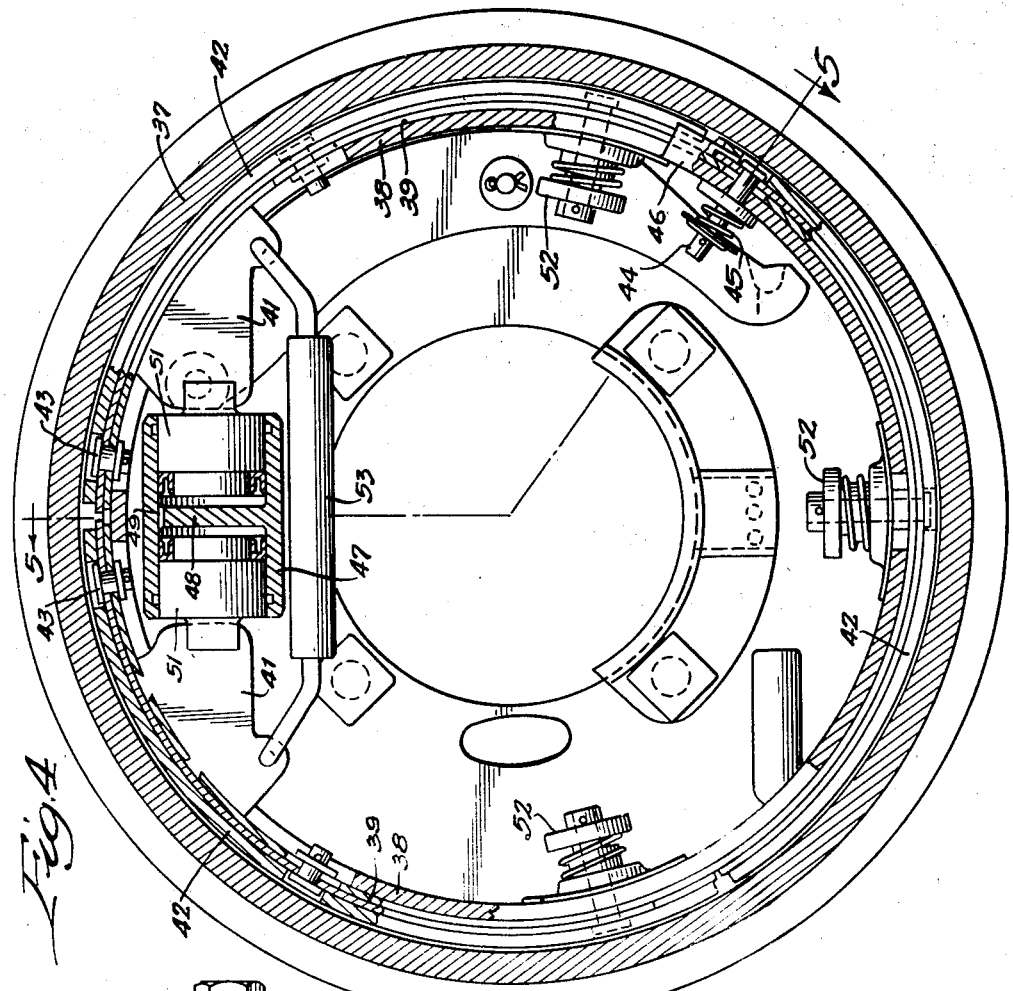
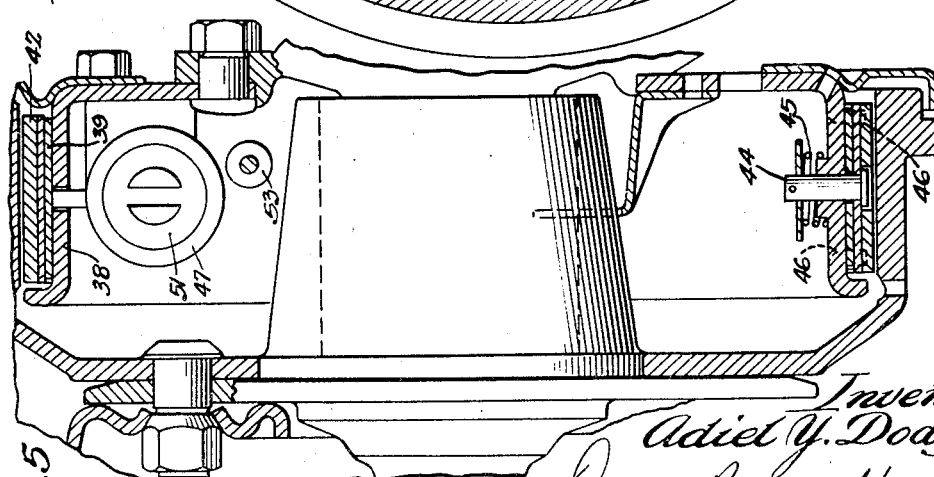

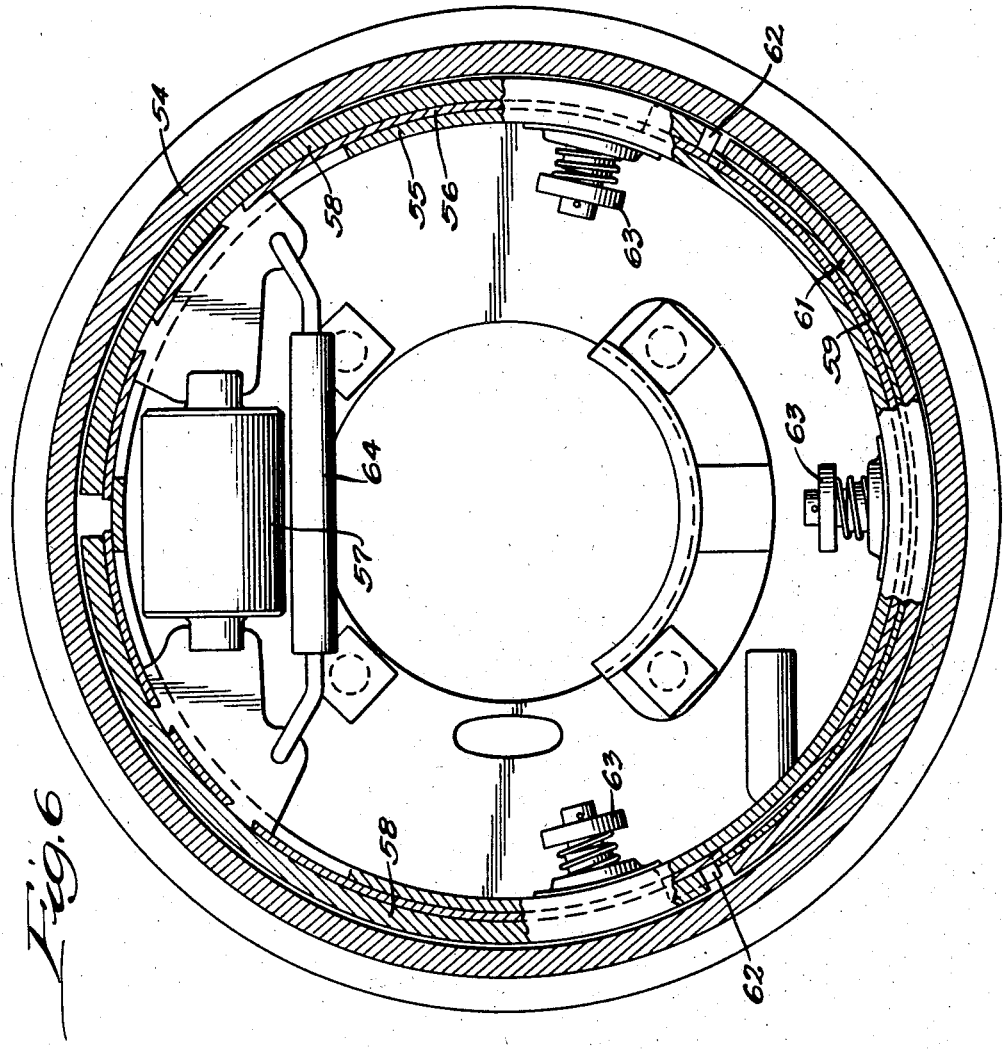

May 16, 1950 A. Y. DODGE 2,508,105
BRAKE
Filed Jan. 18, 1947 4 Sheets-Sheet 4

Inventor:
Adiel Y. Dodge,
By Dawson, Booth and Spangenberg
Attorneys.

Patented May 16, 1950

2,508,105

UNITED STATES PATENT OFFICE 2,508,105

BRAKE

Adiel Y. Dodge, Rockford, Ill.

Application January 18, 1947, Serial No. 722,836

10 Claims. (Cl. 188—78)

This invention relates to brakes and more particularly to relatively light duty brakes of the type used on passenger automobiles.

It has been proposed heretofore as, for example, in my Patents No. 2,206,742, and No. 2,263,263 to provide a brake of this type in which a plurality of brake segments are pressed into engagement with the brake drum by a flexible band expanded by an actuating means such as a hydraulic cylinder. The segments are held against circumferential movement by abutments on the backing plate or support which engage the ends of the segments and are urged radially outward by expansion of the band. In a construction of this type each of the segments becomes individually mildly self-actuating, but all of the expansion force acting on the band is applied by the actuating means.

It is one of the objects of the present invention to provide a brake operated by a flexible band or similar operating mechanism in which a portion of the braking force is applied to the band to assist in expanding it. This construction makes the brake self-actuating so that the pedal may be operated easier without sacrificing the uniformity of wear and other desirable operating characteristics which result from a brake of this general type.

Another object is to provide a brake in which any desired degree of self-actuation can be obtained in either or both directions.

Still another object is to provide a brake in which the same brake construction can be made self-actuating or not, as desired.

A further object is to provide a brake in which rattling or clicking of the brake parts during operation is eliminated.

A still further object is to provide a brake in which the hydraulic actuating cylinder functions also as a dashpot to eliminate rattles or clicks.

The above and other objects and advantages of the invention will be more readily apparent from the following description when read in connection with the accompanying drawings, in which—

Figure 4 is a view similar to Figure 1 of an alternative construction;

Figure 5 is a section on the broken line 5—5 of Figure 4;

Figures 6 and 7 are views similar to Figure 1 of still other alternative constructions;

Figure 1:
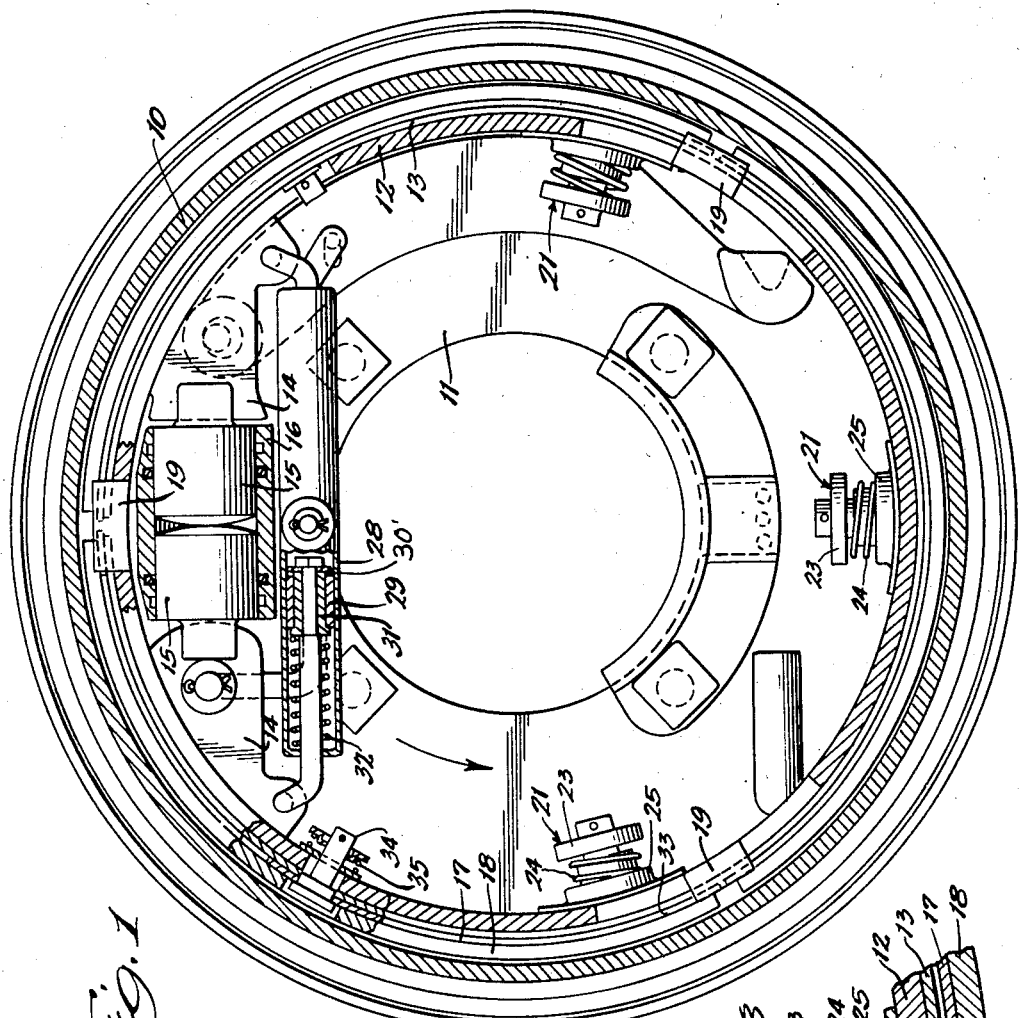
Figure 1 is a transverse section through a brake embodying the invention.
Figure 8:
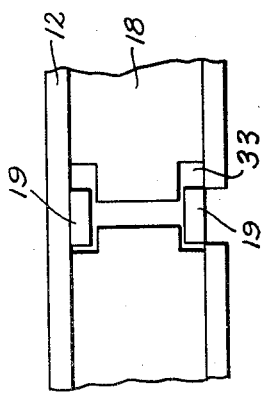
Figure 8 is a partial side view of the brake assembly with the drum removed illustrating engagement of the brake segments with the abutment 19.
Figures 2, 3:
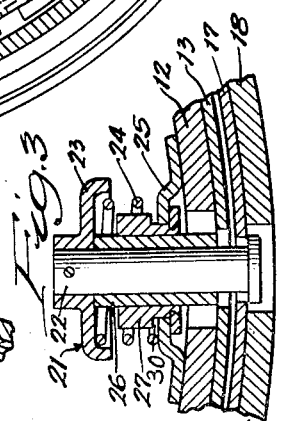
Figure 2 is a partial section similar to Figure 1 illustrating the brake connected for no self-actuation from one segment to another.
Figure 3 is an enlarged partial section through one of the return spring and adjusting devices.

The brake as shown in Figures 1 to 3 is adapted to be used with the usual cylindrical brake drum 10 which is connected to or which may form a part of the supporting structure of an automobile wheel. The brake itself comprises a backing plate or support 11 which is fixed adjacent the brake drum and which has an annular cylindrical flange 12 lying within the brake drum. All of the brake parts are carried by the backing plate or support for cooperation with the brake drum.

The braking mechanism comprises an operating band 13 which may be a relatively narrow flexible metal band overlying the support with its ends separated. The band normally lies closely adjacent to the support when the brake is disengaged and is adapted to be expanded during brake engagement by any desired type of actuating means. As shown, the ends of the band carry fins 14 which extend through slots in the support in the manner best shown in Figures 4 and 5 in connection with the corresponding fins 41 and which are connected to opposed pistons 15 in a hydraulic wheel cylinder 16. Liquid may be supplied to the central part of the cylinder by the usual master cylinder to separate the pistons thereby to expand the band radially away from the support. Instead of a band it will be apparent that a lever system, as shown, for example, in my applications Serial No. 638,166 filed December 29, 1946 and Serial No. 644,459 filed January 13, 1946 might be employed.

A plurality of separate brake segments overlie the operating band 13 and are adapted to be moved into engagement with the brake drum when the band is expanded. As shown, each of the segments comprises a relatively thin metal backing 17 which carries a friction lining 18 to engage the drum. In the brake shown three such segments are employed, and they are of such a length that they extend substantially completely around the support to provide a braking surface extending throughout approximately 340 degrees. When the ends of the band are separated, the segments will be moved radially outward to engage the drum and apply a braking force thereto.

Circumferential movement of the segments on the support is limited by abutments 19 which may be formed tongues bent integrally from the support and extending outward to engage the segments adjacent their ends. It will be noted that the segments can move radially relative to the abutments without interference so that they will uniformly engage the drum throughout their full lengths.

The segments and band are adapted to be moved away from the drum and toward the support by automatically adjustable return devices indicated generally at 21, at least one of which is provided for each of the shoes. These devices which may be constructed as more particularly described and claimed in my copending application Serial No. 693,642, filed August 29, 1946, are best seen in Figure 3. As shown, the return devices comprise headed pins 22 extending through and connected to the segments and projecting loosely through enlarged openings in the operating band and the support. At their outer ends the pins carry annular caps 23 which engage springs 24 which in turn seat against plates 25 slidable on the inner surface of the support. The springs thus urge the segments and the band away from the drum to disengage the brake.

Automatic adjustment is provided by sleeves 26 fitting tightly on the pins and frictionally engaging collars 27 which extend through openings in the plates 25. The collars 27 are provided with reduced portions extending through the plates 25 and terminating in enlarged heads on opposite sides of the plates so that they can move freely through the plates a limited predetermined distance fixed by the difference between the thickness of plates 25 and the spacing between the heads on collars 27 as indicated at 30 in Figure 3 after which further movement is prevented. If during a brake application the band and segments should be moved outward further than the amount permitted by the free movement of the collars the sleeves 26 will slide through the collars so that the band and segments cannot return to a position against the support but will be held a pre-determined distance from the drum to provide a substantially constant initial clearance.

The upper ends of the band and segments are returned by an adjustable spring device interconnecting the two ears 14 and which includes an outer sleeve 28 connected to one of the ears. Within the outer sleeve is a friction sleeve 29 through which a collar 31 slidably extends. The collar is connected to the other ear 14 and is urged inwardly of the sleeve by a spring 32. It will be noted that the collar 31 is slightly longer than the sleeve 29 and is flanged at its ends to provide a limited amount of free movement in the sleeve as indicated at 30' to provide for normal brake application and that upon excessive movement the collar will engage the sleeve 29 and move it in the tube 28 to adjust the initial clearance automatically.

According to the present invention a desired proportionate amount of the braking force is applied to the operating band 13 to assist in expanding the band and to provide for self-actuation thereof. As shown in Figure 1, this is accomplished by cutting or notching the backing plate 17 for one of the shoes adjacent the actuating means as indicated at 33 so that it will not engage the adjacent abutment 19. This shoe is then connected to the operating band by a pin 34 extending through and fitting tightly in openings in both the segment and the band and which extends loosely through an enlarged opening in the support. The pin may be urged toward the center of the brake drum by a spring 35 so that it will also act as a return spring device. With this construction when the drum is turning counterclockwise as seen in Figure 1, the brake force developed by the first segment will be transmitted directly to the operating band to assist in expanding the band. Therefore, the force of the first segment will assist in moving the remaining two segments radially. As shown, only one of the segments is connected to the operating band so that the brake is self-actuating in only one direction although it could be made self-actuating in both directions by similarly connecting the segment on the opposite side of the actuating means to the band. If it is desired to eliminate the self-actuation, the same brake construction can be employed with elimination of notching of the first brake segment as indicated at 33 and with substitution of a pin 36 as shown in Figure 2 for the pin 34. It will be noted that this pin is of a reduced diameter at the part thereof which registers with the operating band 13 so that the operating band and the segment can move circumferentially relative to each other. The first segment will then engage the abutment 19 adjacent its end so that the operating band will be expanded only in response to the force applied thereto by the actuating means. At this time the operating band does not tend to move circumferentially so that no stop is necessary for it. At other times circumferential movement of the operating band may be limited by engagement of the ears 14 thereon with the cylinder 16.

Figures 4 and 5 illustrate an alternative construction including a cylindrical drum 37 having an annular support 38 lying within it and with an operating band 39 overlying the support. The band carries ears 41 adjacent its ends for connection to an actuating means such as a hydraulic cylinder. A plurality of segments which may be identical with the segments 42 as shown in Figure 1 overlie the operating band and are adapted to engage the drum when the band expands.

In this construction the brake is made self-actuating in both directions by connecting the band to the ends of the segments which lie adjacent the actuating means by pins 43. With the pins located as shown closely adjacent the ends of the segments, the tangential force of the first segment is transmitted to the end of the control band adjacent the actuating means to assist in expanding the band throughout its length. During reverse braking the third segment delivers force to the control band in the same manner.

The second or center segment is connected to the support by a pin 44 which fits tightly in openings in the support and in the second segment near one of its ends but which extends loosely through an enlarged opening in the operating band. The pin thus limits relative circumferential movement of the second segment on the support but does not interfere with movements of the operating band. Preferably, a spring 45 is provided to urge the pin 44 outward so that it may also act as a return device.

To assist the pin 44 in absorbing the braking force of the second segment particularly during forward operation which as illustrated would produce a counter-clockwise rotation of the drum, additional abutments are provided on the support. As best seen in Figure 5 the abutments are formed by turned up lips or flanges 46 from the support similar to the abutments 19 of Figure 1 and which are so positioned that they will be parallel to the pin 44 and will engage the second segment near its end to prevent movement thereof in a counter-clockwise direction. The braking force of the second segment in the reverse direction is ordinarily considerably smaller and may be taken directly by the pin 44.

The actuating means in this construction forms an abutment for the ends of the band and in the preferred form is so arranged as to provide a dashpot effect to eliminate clicking or rattling of the ends of the segments or of the band during initial brake application. As shown, the actuating means comprises a hydraulic cylinder 47 divided in its center by a transverse partition 48 which is provided with an opening 49 therethrough. Inlet and outlet ports for the fluid communicate with the central part of the opening 49 so that the fluid can flow both ways into both ends of the cylinder. Pistons 51 are slidable in the opposite ends of the cylinder and engage the ears 41 on the band.

When fluid is initially forced into the cylinder, it will flow into both ends thereof to force both of the pistons 51 outward. Assuming that the drum is turning counterclockwise, the band will exert a relatively large force on the right hand piston and a much smaller force on the left hand piston.

This will cause fluid to be forced from the right hand end to the left hand end of the cylinder through the opening 49, but this opening may be made quite restricted so that the right hand piston will act as a dashpot to slow down the movement of the band. Eventually the right hand piston will seat against the dividing wall 48, but since it is brought gradually into contact with the wall, there will be no clicking or rattling, and a very quiet brake operation will be produced. It will be noted that the second segment will not click or rattle since it is always in engagement with its abutment.

The segments and operating band may be returned by return spring devices 52 and 53 similar to the return spring devices 21 and 28 of Figure 1.

In the construction illustrated in Figure 6 the brake comprises an annular drum 54 having an annular support 55 therein which carries a flexible operating band 56. The band may be expanded by an actuating device 57 similar to the hydraulic cylinders shown in the preceding figures.

Two segments adjacent the actuating means 57 are formed by friction material 58 which is directly connected to and supported by the operating band itself. This material may be in the form of the usual brake lining material directly fastened throughout its length to the metal operating band. The center segment may comprise a backing sheet 59 carrying friction material 61 and may loosely overlie the band for circumferential movement relative thereto. Abutments 62 carried by the backing plate adjacent the ends of the second segment limit circumferential movement thereof on the backing plate. The segments and operating band may be urged inward by return spring devices 63 and 64 similar to the devices 21 and 28 of Figure 1.

In operation of this brake the two end segments are directly connected to the band so that all of their braking force must be transmitted to the band to assist in expanding it. The center segment is moved outward by the band, but its braking force is absorbed entirely by the abutments 62. This provides an extremely simple yet highly effective brake construction.

Figure 7:
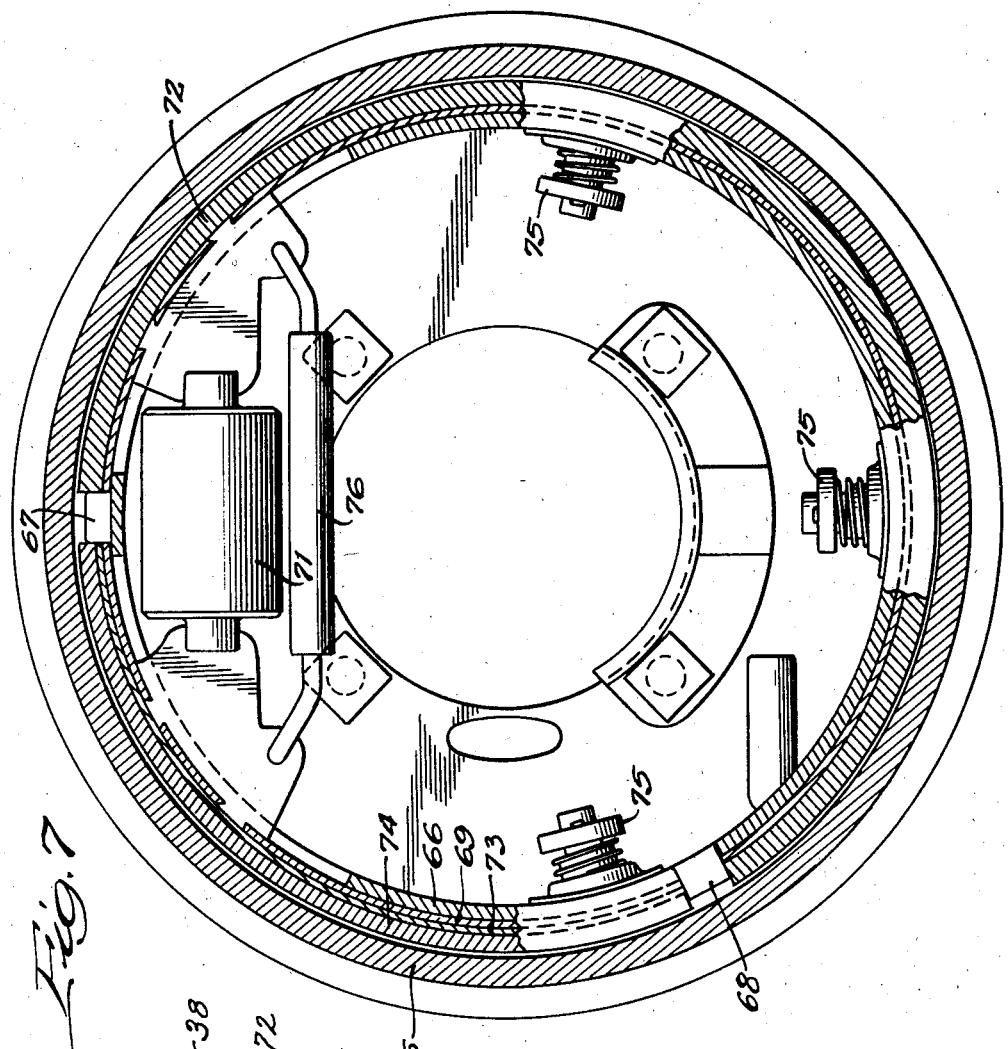
Figure 9:
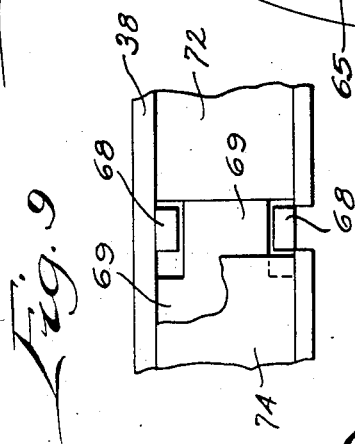
Figure 9 is a partial view of the brake of Figure 7 with the drum removed.

The construction shown in Fig. 7 comprises a cylindrical brake drum 65 within which an annular support or backing plate 66 is mounted.

The support carries a pair of fixed abutments 67 and 68 lying at positions corresponding to twelve o'clock and eight o'clock, these positions of the abutments being provided for clockwise rotation of the drum during forward movement of the vehicle. A flexible separated band 69 overlies the support with its separated ends abutting the abutment 67 so that circumferential movement will be limited. The band is preferably notched adjacent the abutment 68 so that during clockwise rotation of the drum a shoulder on the band will engage the abutment 68 and during counterclockwise rotation the band can move freely relative to the abutment 68. The band may be spread by a separating means 71 which may be the usual hydraulic cylinder.

The band carries two segments, one of which is formed by friction material 72 directly secured to the band and extending substantially from the twelve o'clock to the eight o'clock position thereon. The second segment is formed by a backing sheet 73 loosely overlying the band and carrying friction material 74. The segment 73 extends between the abutments 67 and 68 to engage them respectively at its opposite ends. Return devices 75 and 76 urge the segments and the band toward the support and may provide for automatic adjustment, as explained above.

In operation of this brake during forward braking with the drum turning clockwise, the band will engage the abutment 68 and will be expanded to bring the friction material 72 into engagement with the drum. The portion of the band carrying the friction material 72 will be self actuating substantially throughout its length. The portion of the band between the abutments will expand independently to move the friction material 74 into engagement with the drum so that operation of this segment is independent of operation of the friction portion 72. During reverse braking with the drum turning counterclockwise, the segment 74 will be urged into engagement with the drum by the expansion of the band and this segment will abut against the abutment 68. The band will engage the abutment 67 and will be self actuating throughout the extent of the friction material 72.

While several embodiments of the invention have been shown and described in detail herein, it will be understood that they are illustrative only and are not to be taken as a definition of the scope of the invention, reference being had for that purpose to the appended claims.

What is claimed is:

1. A brake comprising a support adapted to lie adjacent to a cylindrical brake drum, annular expansible operating means on the support separated at one point whereby it can expand radially, actuating means acting on the operating means to expand it, a plurality of friction segments connected to the operating means to be moved thereby into engagement with the brake drum, one of the segments adjacent the actuating means being secured to the operating means against relative circumferential movement and another segment spaced from the actuating means being movable circumferentially relative to the operating means, and abutment means carried by the support to hold the last named segment against circumferential movement.

2. A brake comprising a support adapted to lie adjacent to a cylindrical brake drum, annular expansible operating means on the support separated at one point whereby it can expand radially, actuating means acting on the operating means to expand it, a plurality of friction segments connected to the operating means to be moved thereby into engagement with the brake drum, one of the segments adjacent the actuating means being formed by friction material carried directly by the operating means and a second segment spaced from the first-named segment being movable circumferentially relative to the operating means, and abutment means carried by the support to hold the last-named segment against circumferential movement.

3. A brake comprising an annular support adapted to lie within a cylindrical brake drum, a flexible operating band overlying the support, actuating means to spread the ends of the band whereby it will expand radially toward the brake drum, a plurality of friction segments overlying the band to engage the drum, one of the segments adjacent the actuating means being connected to the band to prevent relative circumferential movement and another segment spaced from the actuating means being free to move circumferentially relative to the band, and abutment means carried by the support to hold the last-named segment against circumferential movement thereon.

4. A brake comprising an annular support adapted to lie within a cylindrical brake drum, a flexible operating band overlying the support, actuating means to spread the ends of the band whereby it will expand radially toward the brake drum, a plurality of friction segments overlying the band to engage the drum, one of the segments adjacent the actuating means being formed by friction material carried directed by the band and another segment spaced from the first-named segment being free to move circumferentially relative to the band, and an abutment carried by the support to limit circumferential movement of said other segment.

5. A brake comprising an annular support adapted to lie within a cylindrical brake drum, a flexible operating band overlying the support, actuating means to spread the ends of the band whereby it will expand radially toward the brake drum, a plurality of friction segments overlying the band to engage the drum, abutments on the support to limit circumferential movement of the segments thereon, and removable fastening means to connect one of the segments adjacent to the actuating means against circumferential movement relative to the band to transmit circumferential force on the segment to the band.

6. A brake comprising an annular support adapted to lie within a cylindrical brake drum, a flexible operating band overlying the support, actuating means to spread the ends of the band whereby it will expand radially toward the brake drum, a plurality of friction segments overlying the band to engage the drum, abutments on the support to limit circumferential movement of the segments thereon, and a fastening connecting the band against circumferential movement relative to the end of one of the segments adjacent the actuating means to prevent relative rotation therebetween.

7. A brake comprising an annular support adapted to lie within a cylindrical brake drum, a flexible operating band overlying the support, actuating means to spread the ends of the band whereby it will expand radially toward the brake drum, a plurality of friction segments overlying the band to engage the drum, there being three segments arranged in end to end relation and extending substantially completely around the support with two of the segments having their ends adjacent the actuating means, the segments adjacent the actuating means being connected to the band and the center segment being free to move circumferentially relative to the band, and abutments on the support to limit circumferential movement of the second segment thereon.

8. A brake comprising an annular support adapted to lie within a cylindrical brake drum, a flexible operating band overlying the support, actuating means to spread the ends of the band whereby it will expand radially toward the brake drum, a plurality of friction segments overlying the band to engage the drum, there being three segments arranged in end to end relation and extending substantially completely around the support with two of the segments having their ends adjacent the actuating means, the segments adjacent the actuating means being formed by friction material directly carried by the band and the center segment being free to move circumferentially relative to the band, and abutments on the support to limit circumferential movement of the second segment thereon.

9. A brake comprising an annular support adapted to be mounted adjacent a cylindrical brake drum, annular expansible and contractible operating means carried by the support, actuating means to control expansion and contraction of the operating means, a plurality of brake segments adjacent to the operating means to be moved thereby into engagement with the drum, an abutment carried by the support to limit circumferential movement of one of the segments, and another of the segments being connected to the operating means to transmit its braking force thereto.

10. A brake comprising a support adapted to be mounted adjacent a brake drum, a plurality of segments carried by the support for movement into engagement with the brake drum, operating means carried by the support to move the segments thereon, abutment means for one of the segments including a pin connected to said one of the segments and slidably connected to the support for generally radial movement, and a fixed abutment on the support engaging an end of said one of the segments and lying parallel to the pin.

ADIEL Y. DODGE.

REFERENCES CITED

The following references are of record in the file of this patent:

UNITED STATES PATENTS

| Number | Name | Date |
|---|---|---|
| 1,292,849 | Morse | Jan. 28, 1919 |
| 1,649,085 | Snyder | Nov. 15, 1927 |
| 1,773,120 | Richter | Aug. 19, 1930 |
| 1,934,235 | Rockwell | Nov. 7, 1933 |
| 1,991,525 | Thomas | Feb. 19, 1935 |
| 2,032,473 | Crossland | Mar. 3, 1936 |
| 2,152,104 | Tatter | Mar. 28, 1939 |
| 2,206,742 | Dodge | July 2, 1940 |
| 2,224,215 | Chartock et al. | Dec. 10, 1940 |
| 2,234,689 | Chard | Mar. 11, 1941 |
| 2,312,363 | Sawtelle | Mar. 2, 1943 |
| 2,329,095 | White | Sept. 7, 1943 |
| 2,345,107 | Goepfrich | Mar. 28, 1944 |

FOREIGN PATENTS

| Number | Country | Date |
|---|---|---|
| 413,089 | Great Britain | July 12, 1934 |